United States Patent [19]

Dorner et al.

[11] Patent Number: 5,038,462
[45] Date of Patent: Aug. 13, 1991

[54] APPARATUS FOR ASSEMBLING ARTICLES FROM TWO HALVES SUCH AS VIDEO CASSETTE CONTAINERS

[75] Inventors: Wolfgang C. Dorner, Oconomowoc; Michael A. Hosch, Wales, both of Wis.

[73] Assignee: Dorner Mfg. Corp., Hartland, Wis.

[21] Appl. No.: 404,743

[22] Filed: Sep. 8, 1989

[51] Int. Cl.⁵ .............................................. B23P 19/04
[52] U.S. Cl. ........................................ 29/773; 29/240; 29/463; 29/806
[58] Field of Search ................. 29/463, 772, 773, 787, 29/790, 783, 801, 806, 240, 784; 53/307; 221/211; 74/840; 414/96

[56] References Cited

U.S. PATENT DOCUMENTS 3,418,786  12/1968  Christine et al. ................ 53/307 X
3,509,682   5/1970  Logemann ....................... 53/307 X
4,035,899   7/1977  Matsuda ............................... 29/773
4,306,663  12/1981  Gelardi et al. .................. 29/463 X

FOREIGN PATENT DOCUMENTS 49812  4/1977  Japan ..................................... 29/806

Primary Examiner—Timothy V. Eley
Assistant Examiner—Peter Dungba Vo
Attorney, Agent, or Firm—Andrus, Sceales, Starke & Sawall

[57] ABSTRACT

An apparatus for assembling containers from a pair of open faced container sections or halves comprising a frame having a first receiving station and a second receiving station straddling an assembly station. A plurality of first container sections are deposited on a supporting surface at the first receiving station and a plurality of second container sections are deposited on a supporting surface at the second receiving station. A transfer mechanism initially moves from a position above the assembly station to a position above the second receiving station, and an inverting unit moves the first container sections from the first receiving station to the assembly station and inverts the sections, and the transfer mechanism then transfers the second container sections from the second receiving station to the assembly station. The first and second container sections are then moved into mating assembled relation at the assembly station to form a plurality of assembled containers, and a pusher mechanism discharges the assembled containers from the assembly station to a discharge site.

18 Claims, 5 Drawing Sheets

APPARATUS FOR ASSEMBLING ARTICLES FROM TWO HALVES SUCH AS VIDEO CASSETTE CONTAINERS

BACKGROUND OF THE INVENTION

Small containers, such as video cassette containers, are formed of two molded plastic halves which are assembled to form the closed container. In a typical automated molding procedure, a group of bottom container halves and a group of top container halves are individually molded and the halves are removed from the dies by robots and placed at an assembly site. Subsequently the halves are manually assembled to form the containers.

There has been a need for a mechanism which would automatically receive parts from a robot, assemble the parts into containers and discharge the assembled containers to a discharge location.

SUMMARY OF THE INVENTION

The invention is directed to an apparatus for assembling containers or other articles from pairs of tray-like halves or sections, each having an open face. The apparatus includes a supporting structure that defines a first receiving station and a second receiving station that straddle an assembly station. A group of first open face container sections or halves are deposited open face down on a supporting surface at the first receiving station, and similarly a group of second open face container sections are deposited open face down on a supporting surface at the second receiving station.

A pivotable inverting unit acts to transfer the first sections from the first receiving station to the assembly station and inverts the first sections during the transfer. More specifically, the inverting unit includes a supporting platform or turntable that faces upwardly when the inverting unit is at the assembly station and faces downwardly when the supporting platform is pivoted to the first receiving station. A gripping mechanism, which may take the form of suction cups, is mounted on the supporting platform and engages the sections at the first receiving station, when the supporting platform is in its pivoted position. When the platform is pivoted back to its original position, the first container sections will be inverted, so that the open faces face upwardly.

A transfer mechanism, which is movable between a position over the assembly station to a position over the second receiving station, acts to engage and transfer the second container sections from the second receiving station to the assembly station. The first and second sections are then moved vertically into mating relation at the assembly station to form a plurality of assembled containers. A pusher mechanism is employed to push the assembled containers from the platform to a discharge conveyor where they are conveyed to a discharge site.

In a preferred form of the invention to be used in high speed applications, the platform or turntable of the inverting unit is mounted for rotational movement about a vertical axis. The containers are assembled in a pair of rows on the platform, with one of the rows being aligned with a reciprocating pusher mechanism. After the pusher mechanism has pushed one row of assembled containers from the platform, the platform is rotated to position the second row in alignment with the pusher mechanism for discharge.

In this arrangement, the pusher mechanism includes a pusher plate, which can be moved between a vertical pushing position and an upper inoperative or non-obstructing position, where it will not contact containers on the platform. After the pusher plate has pushed a row of containers from the platform, it is pivoted to its inoperative position, and then returned to its original retracted position. Simultaneously, the platform is rotated to position a second row of containers in alignment with the stroke of movement of the pusher plate, and as the pusher plate is in the upper unobstructing position as it is retracted, it will not interfere with movement of the assembled articles, as the platform is rotated.

As a further feature, the invention incorporates a reject mechanism, which can comprise a chute which is located opposite the discharge conveyor. By pivoting the pusher plate to the vertical position, and retracting the pusher plate to its original position, a row of articles will be drawn across the platform to the reject chute and thus conducted to a reject site. The reject mechanism can be utilized in instances where the assembled containers may be defective, or in other instances where downstream equipment cannot keep up with the pace of assembly, in which case the assembled containers may be routed through the reject chute to a storage location.

The invention also includes a novel drive mechanism for pivoting the platform, which insures that the platform will be precisely parallel to the supporting surface at the first receiving station, so that the articles can be properly engaged and gripped by the suction cups or gripping mechanism.

The apparatus of the invention automatically receives components from molding machines, assembles the components into containers and discharges the containers to a discharge location.

Other objects and advantages will appear in the course of the following description.

DESCRIPTION OF THE DRAWINGS

The drawings illustrate the best mode presently contemplated of carrying out the invention.

In the drawings:

FIG. 4 is a section taken along line 4—4 of FIG. 1 and showing the pusher mechanism for pushing the assembled containers to a discharge conveyor;

DESCRIPTION OF THE ILLUSTRATED EMBODIMENT

Figure 1:
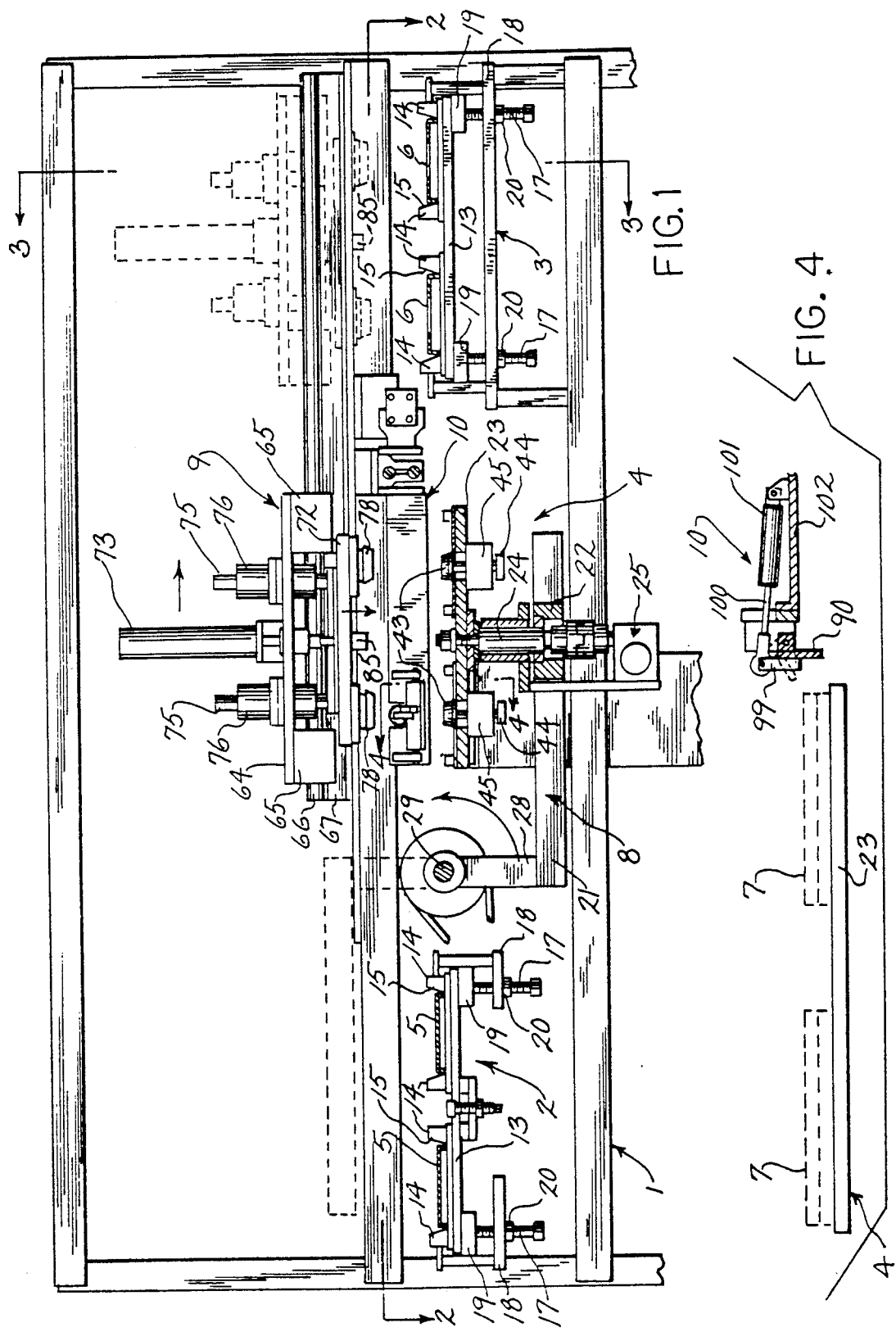
FIG. 1 is a front elevation of the apparatus of the invention, with parts broken away in section.

The drawings illustrate an apparatus for assembling two open-top halves or container sections into a closed container, and has particular application for assembling the halves of a video cassette container.

The apparatus includes a frame or supporting structure 1 and a pair of receiving stations 2 and 3 are mounted on the frame on either side of an assembly station 4. A group of open-faced container sections or parts 5 are fed to receiving station 2, either manually or through a robot, and similarly a group of opposite container parts or sections 6 are fed to receiving station 3. The parts 5 and 6 are assembled into a closed container 7 at the assembly station 4.

In general, an inverting unit 8 is located at assembly station 4 and moves the group of open-sided parts 5 from receiving station 2 to the assembly station 4, while at the same time inverting parts 5, so that the open side faces upwardly. Parts 6 are moved from receiving station 3 to assembly station 4 by a transfer unit 9 and are then moved downwardly onto the parts 5 at the assembly station to provide the assembled containers. The assembled containers 7 are then pushed from the assembly station 4 by a pusher unit 10, and are discharged onto a conveyor 11, where the containers are conveyed to other processing equipment or storage.

Receiving stations 2 and 3 are similar in construction and each includes a base plate 13 and a plurality of guide rails 14 extend upwardly from each plate 13 and define a group of pockets or recesses 15 that receive the respective parts 5 and 6. As shown in the drawings, each plate 13 is provided with four pockets 15, but it is contemplated that any number of pockets can be formed in the plates 13.

Figure 8:
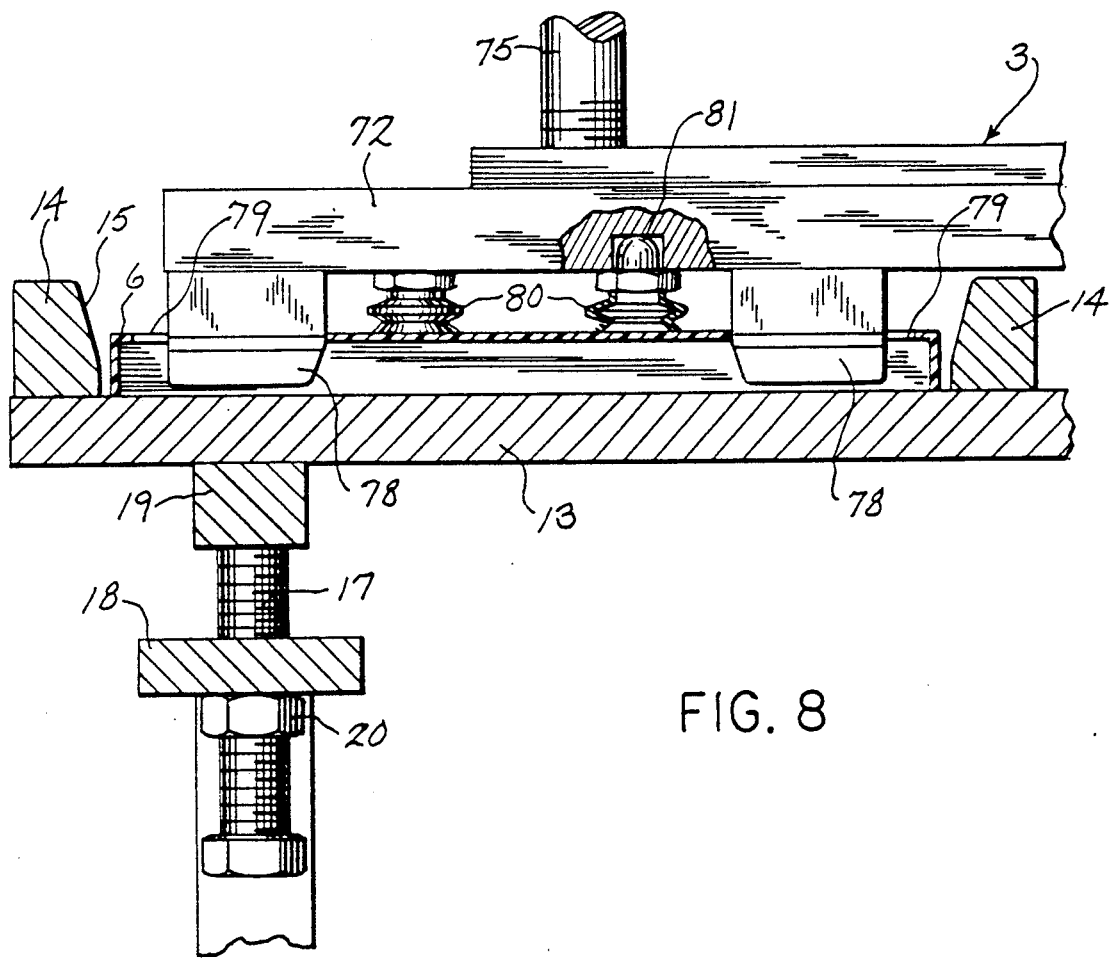
FIG. 8 is an enlarged fragmentary front elevation of a receiving station.

As best shown in FIGS. 1 and 8, the inner surface of each guide 14 is tapered downwardly and inwardly and the tapered surfaces aid in guiding the parts 5,6 to a properly indexed location on plate 13, as the parts are deposited in the pockets 15 either manually or through a robot mechanism.

Plates 13 can be leveled by means of adjustable jacks 17 which are located at the corners of plates 13. Each threaded jack 17 extends through a threaded frame member 18 of frame 1 and the upper end of the jack bears against a block 19 mounted on the lower surface of plate 13. Lock nut 20 is threaded on the lower end of each jack 17. By threaded adjustment of jacks 17, plates 13 can be levelled, as well as providing the proper vertical position for each plate.

The assembly station 4 includes a pair of generally horizontal beams 21 which carry a cross plate 22 and a turntable or platform 23 is located above cross plate 22. A vertical shaft 24 extends downwardly from turntable 23 and is journalled in plate 22. A suitable drive mechanism, indicated by 25, is operably connected to shaft 24 and operation of drive mechanism 25 will rotate turntable 23 about the axis of shaft 24, as will be hereinafter described.

Figure 2:
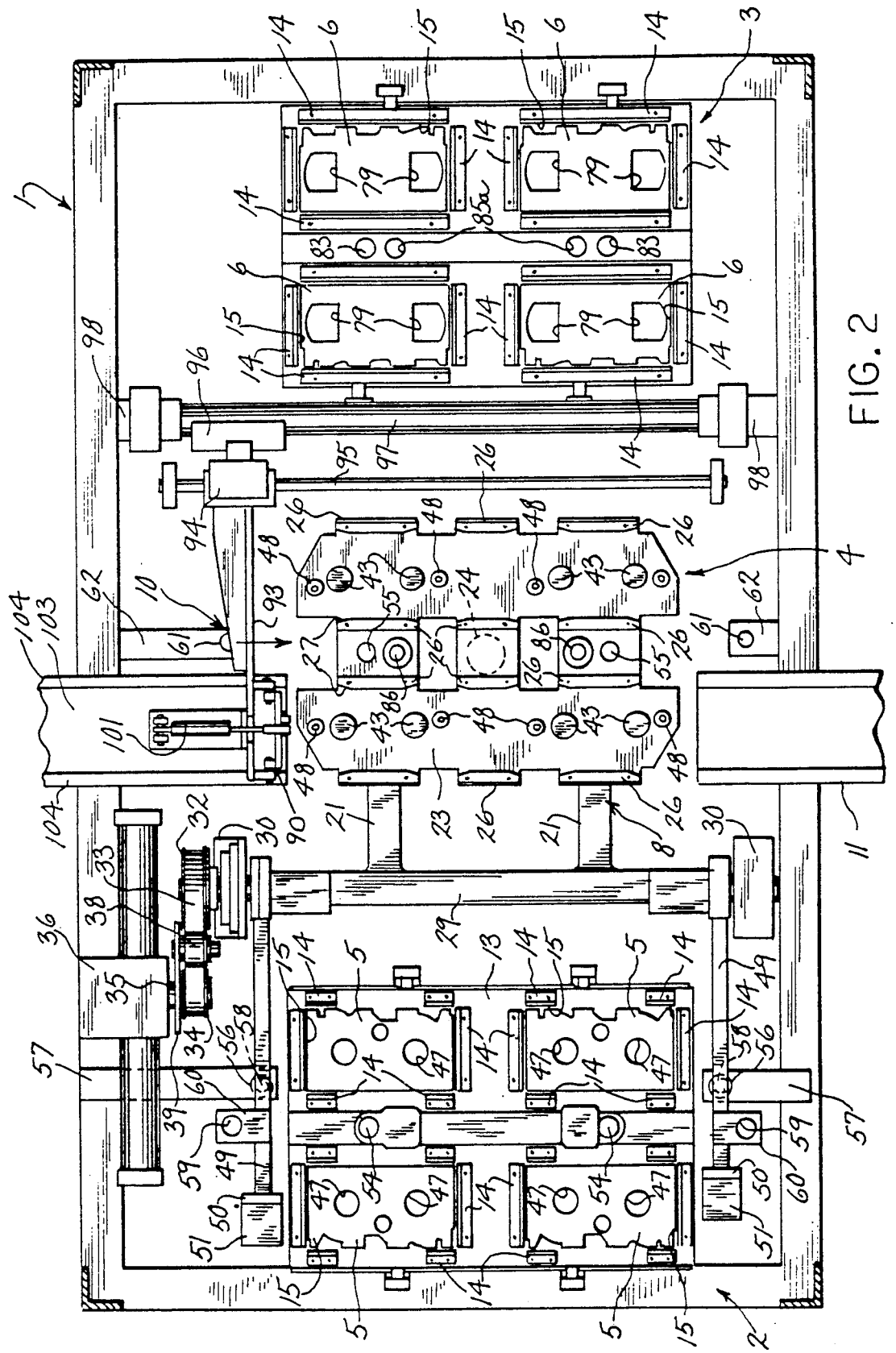
FIG. 2 is a top plan view of the apparatus.

A plurality of guides 26 project upwardly from turntable 23 and define two parallel receiving rows or troughs 27, which are each adapted to receive two parts 5, when they are transferred from receiving station 2. As shown in FIG. 2, guides 26 are parallel and no cross guides are included, so that the containers 7, when assembled at the assembly station 4, can be discharged from turntable 23 by pusher unit 10.

Base plate 22 is mounted for pivoting movement about a horizontal axis from a position above assembly station 4 to an inverted position above receiving station 2. To provide this pivotal movement, beams 21 are connected through arms 28 to horizontal shaft 29, which is journalled within bearings 30 mounted on frame 1. One end of shaft 29 carries a timing pulley 32 having a plurality of teeth which are engaged by timing belt 33. Belt 33 is also engaged with a second timing pulley 34 that is mounted on shaft 35 of drive unit 36, as seen in FIG. 2. Drive unit 36 can be any standard drive mechanism which, when operated, will cause rotation of shaft 35. Shaft rotation will be transmitted through the belt drive 33 to thereby rotate shaft 29 and pivot beams 21 and turntable 23 from an upright position at the assembly station 4 to a second inverted position at the receiving station 2 above plate 13. The parts 5, with their open sides facing downwardly, are then transferred from plate 13 to turntable 23, as will be hereinafter described. By reversing operation of drive unit 36, beams 21, along with turntable 23 and parts 5, will be returned to the original position at assembly station 4 with the open side of the parts 5 facing upwardly.

Figure 5:
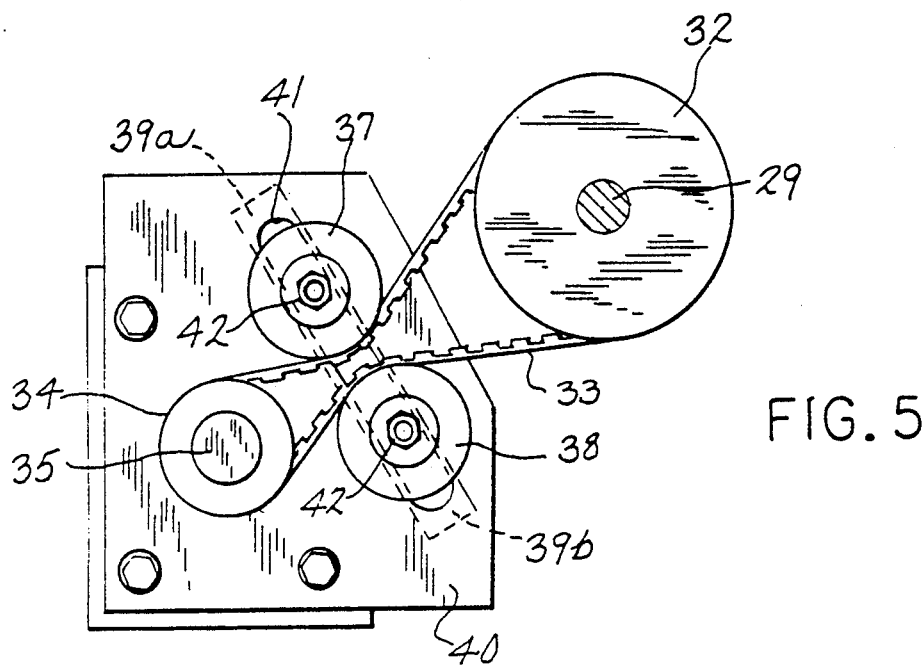
FIG. 5 is a side elevation of a portion of the drive mechanism for pivoting the platform.
Figure 6:
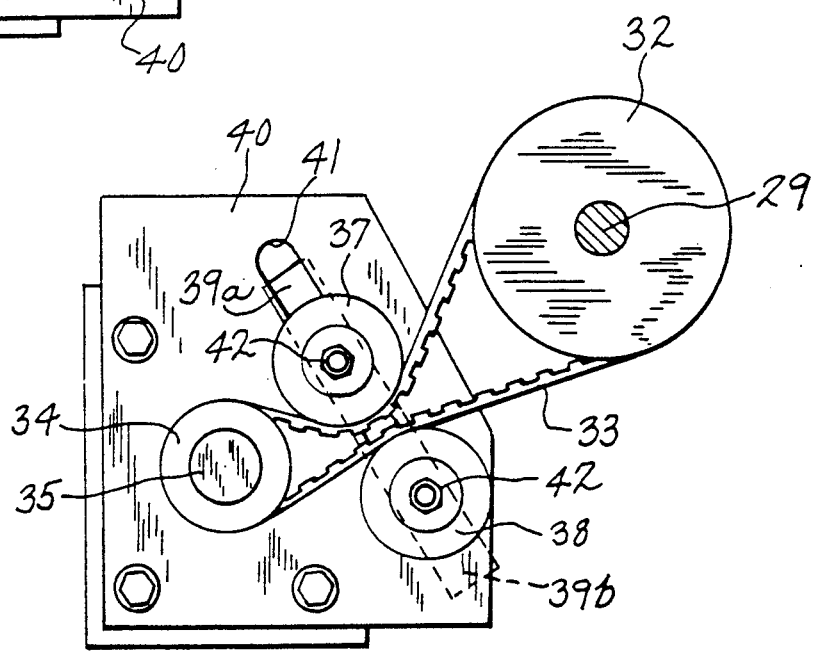
FIG. 6 is a view similar to FIG. 6 and showing the drive in an adjusted position.

It is important that when the table 23 is in the inverted position over the receiving plate 13, that the table be precisely parallel above plate 13. To fine tune the stroke of pivotal movement, an adjusting mechanism is incorporated with timing belt 33. The adjusting mechanism, as seen in FIGS. 5 and 6, includes a pair of cam rollers 37 and 38, which are located on opposite sides of belt 33 and are journalled on bars 39a and 39b, respectively, each of which can be adjusted in position relative to fixed plate 40. The shafts of rollers 37 and 38 extend through a slot 41 in plate 40 and bars 39a and 39b can be locked relative to plate 40 by locking nuts 42. In a neutral position, the runs of belt 33 extending between pulleys 32 and 34 will be equal, as shown in FIG. 5. However, by shifting the bars 39a and 39b and the attached rollers 37 and 38, one of the runs will be shorter than the other run, as shown in FIG. 6, and this will change the angular relationship of the teeth on pulleys 32 and 34 to thereby change the pickup position of table 23, when it is located at receiving station 2. It is important that table 23 be precisely parallel to plate 13 when table 23 is at its pickup position so that parts can be properly transferred to the turntable 23. Not only do cam rollers 37 and 38 enable the tooth relationship to be slightly changed to provide proper pick-up position, but they also provide a tensioning function to maintain tension on belt 33.

Figure 7:
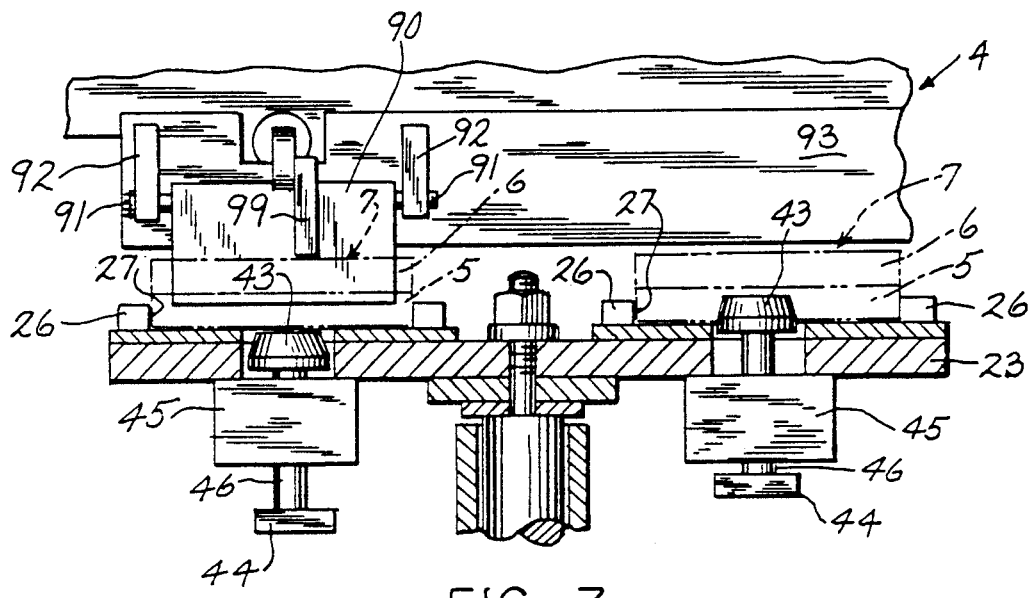
FIG. 7 is an enlarged fragmentary vertical section of the assembly station.

To index the transfer of parts 5 from plate 13 to turntable 23, a series of locator pins 43 are mounted for vertical movement within openings in turntable 23. The lower ends of each row of pins 43 are mounted on a bar 44 that is located beneath turntable 23. A fluid cylinder 45, such as an air cylinder, is mounted on the lower surface of turntable 23 and the piston rod 46 of each cylinder 45 is connected to the respective bar 44. With turntable 23 in its upright position at station 4, operation of cylinders 45 will retract piston rod 46, causing bars 44 and pins 43 to be moved upwardly above the turntable. Conversely, extension of piston rods 46 will move the pins 43 downwardly to a location beneath the level of the upper surface of turntable 23. For purposes of illustration, one of the pins 43 is shown in FIG. 7 to be in a lowered position, while a second pin 43 is shown in the upper position.

Figure 9:
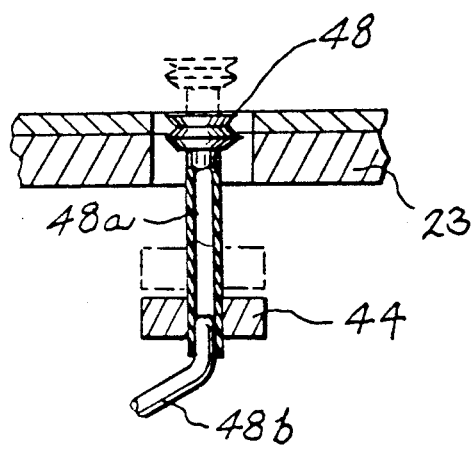
FIG. 9 is an enlarged fragmentary vertical section showing a suction cup on the platform.

In addition, each bar 44 supports a group of suction cups 48. In this regard, tubes 48a are secured in holes in each bar 44 and a suction cup 48 is mounted on the upper end of each tube, as shown in FIG. 9. When the bars 44 are moved in a direction toward turntable 23, the suction cups will be extended through openings in turntable 23. With the turntable in an inverted position, the projecting suction cups will engage the upper surfaces of parts 5 on plate 13 at receiving station 2, as will be hereinafter described. Vacuum lines 48b are connected to the lower ends of tube 48a and by drawing a vacuum through lines 48b, the cups will maintain tight engagement with the parts 5. It is contemplated that other types of gripping mechanism, such as clamping fingers, can be used in place of suction cups 48.

The inverting unit 8 has substantial weight and a counterbalancing mechanism is utilized to partially counterbalance the weight of the inverting unit. In this regard, a pair of arms 49 are connected to shaft 29 and extend in the opposite direction from turntable 23. As seen in FIG. 2, the outer or distal end of each arm 49 carries a plate 50 and a weight 51 is adjustably connected to each plate 50 through a bolt and slot connection, not shown. The vertical adjustment of weight 51 with respect to plate 50 will vary the counterbalancing effect to provide the desired counterbalance for the inverting unit 8.

As previously described, the turntable 23 of inverting unit 8 is adapted to be pivoted through approximately 180° to a position over plate 13 at receiving station 2. To cushion or dampen this pivotal movement, a pair of stops 54, as illustrated in FIG. 2, are mounted on plate 13 between each pair of pockets 5. Hydraulic dampeners 55 are mounted on turntable 23 and are adapted to engage stops 54 as the turntable is pivoted to an inverted position over plate 13. Both stops 54 and dampeners 55 are vertically adjustable. In addition, a second pair of vertically adjustable hydraulic dampeners 56 are mounted on arms 57 that extend inwardly from frame 1 adjacent receiving station 2 and dampeners 56 are adapted to be engaged by stops 58 that are mounted on the underside of arms 49 of the counterbalancing unit.

A provision is also made to cushion the return pivotal movement of the inverting unit 8, as it returns to the assembly station 4. In this regard, a pair of hydraulic dampeners 59 are mounted on arms 60 that extend outwardly from arms 49, as seen in FIG. 2, and as the inverting unit is returned to its location at the assembly station 4, the dampeners 59 engage stops 61, which are mounted on arms 62 that extend inwardly from frame 1. Thus, with this construction, the pivotal movement of the inverting unit 8 is cushioned both in the initial stroke where the turntable is pivoted to an inverted position above plate 13 and also in its return stroke where the turntable is returned to the assembly station 4.

Transfer unit 9 is adapted to elevate the group of parts 6 from receiving station 3 and transfer of the parts to the assembly station 4 and then lower parts 6 downwardly into engagement with the inverted parts 5, which are located on turntable 23, to thereby assembly parts 6 with parts 5 and provide the assembled container 7.

Transfer unit 9 includes a plate-like carriage 64, which is mounted for movement between the assembly station 4 and receiving station 3. Carriage 64 carries a plurality of bushings 65 which ride on parallel horizontal guide rods 66. Guide rods 66 are mounted on frame members 67 of frame 1.

Figure 3:
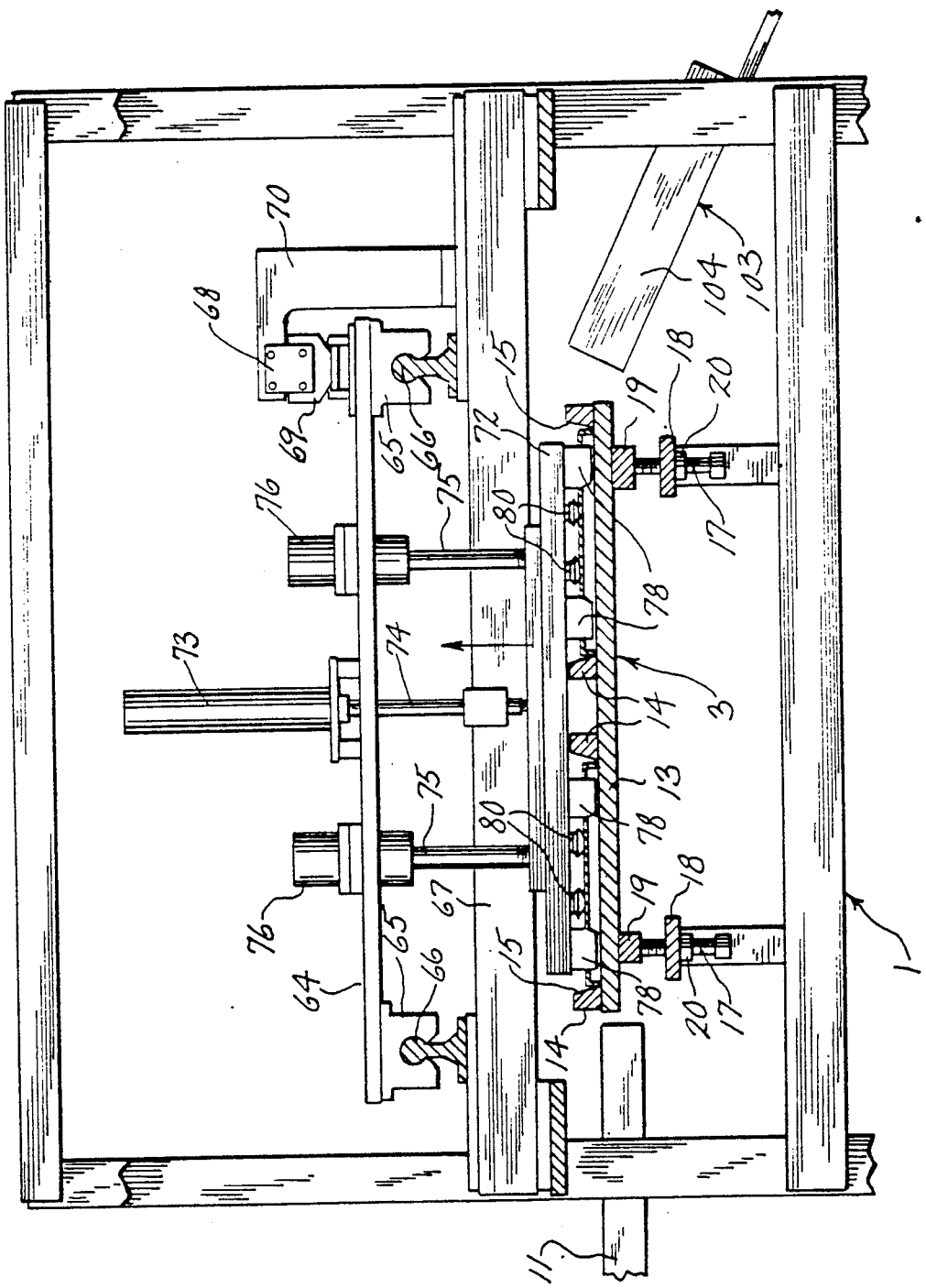
FIG. 3 is a section taken along line 3—3 of FIG. 1.

Carriage 64 is moved between the assembly station 4 and receiving station 3 by a rodless cylinder 68, as shown in FIG. 3. The internal piston of rodless cylinder 68 is connected to a carrier 69 and the carrier is connected to the side edge of carriage 64. Cylinder 68 is connected through L-shaped bracket 70 to frame members 67. With this construction, movement of carrier 69 will move the carriage 64 between the assembly station 4 and receiving station 3.

Transfer unit 9 also includes a plate 72 that is positioned beneath and parallel to carriage 64. Plate 72 is adapted to be moved vertically relative to carriage 64 by a fluid cylinder 73 which is mounted on the upper surface of carriage 64. Piston rod 74, which is slidable relative to cylinder 73, extends downwardly and is connected to plate 72. Extension and contraction of piston rod 74 will move plate 72 downwardly and upwardly relative to carriage 64. To guide plate 72 in vertical movement, a plurality of guide rods 75 are mounted on the upper surface of plate 72 and slide within bushings 76 mounted on carriage 64.

Carriage 64 is adapted to be moved by cylinder 68 from assembly station 4 to a location above receiving station 3. Plate 72 is then moved downwardly toward plate 13 at receiving station 3, and a series of pilots or locators 78 depend from the lower surface of plate 72 and are adapted to be received within holes 79 in parts 6 that are supported on plate 13, as the plate 72 moves downwardly. In addition, a group of suction cups 80 are mounted on the lower surface of plate 72 and are connected through vacuum lines 81 to a suitable source of vacuum or sub-atmospheric pressure. After locators 78 have engaged holes 79 in parts 6, suction cups 80 engage the upper surface of the parts 6 and by drawing a vacuum through line 81, the cups will firmly engage the parts. The plate 72 is then elevated thereby lifting parts 6 from the pockets 15 in plate 13 at receiving station 3. The elevated parts are then transferred laterally to the assembly station 4 by movement of carriage 64, and lowered onto the parts 5 that are held on turntable 23, as will be hereinafter described.

To cushion the downward movement of plate 72, a pair of fixed stops 82 are mounted on plate 72 and are adapted to engage adjustable hydraulic dampeners 83 mounted on plate 13 of receiving station 3.

As the parts 6 carried by transfer unit 9 are lowered downwardly at the assembly station 4, toward the parts 5, a locating mechanism is employed to align the parts 6 and 5. The locating mechanism takes the form of a pair of pilot pins 85 which are mounted on plate 72 and are received within bushings 86 that project upwardly from turntable 23, as seen in FIG. 2. Engagement of pins 85 with bushings 86 ensures that the parts 6 being carried by plate 72 will be properly aligned with the parts 5 that are supported on turntable 23. Earlier in the sequence of operation, when plate 72 is lowered at receiving station 3 to lift parts 6, pins 85 will be received in holes 85a in plate 13.

After the parts 6 are assembled with the parts 5 on turntable 23 to provide the completed container 7, each pair of assembled containers is pushed from the turntable 23 by the pusher unit 10 and discharged onto conveyor 11. Pusher unit 10 includes a pusher plate 90 which is located adjacent assembly station 4 and is mounted for pivoting movement on rods 91, which are journalled in lugs 92 that extend outwardly from arm 93. The opposite end of arm 93 is connected to a bushing 94, which is mounted for sliding movement on horizontal guide rods 95, as illustrated in FIG. 2. The carrier 96 of a rodless cylinder 97 is connected to bushing 94. The rodless cylinder 97 is a conventional type and the internal piston is connected to carrier 96, so that the carrier will move along the length of the cylinder 97 as the piston is actuated, thereby moving the pusher plate 90 in a stroke of movement to push a pair of the assembled containers 7 from turntable 23 onto conveyor 11. The ends of cylinder 97 are connected through brackets 98 to the frame 1.

As best shown in FIGS. 4, pusher plate 90 is adapted to be pivoted from a pushing position where plate 90 extends substantially vertical, to an upper or non-obstructing position where the pusher 90 is above the level of the assembled containers 7 on turntable 23. This pivotal movement is accomplished by mounting an arm 99 to the forward face of pusher plate 90. The upper end of arm 99 is pivotally connected to the end of a piston rod 100, which is slidable relative to cylinder 101, that is mounted on plate 102.

Plate 102 is connected to and extends laterally from arm 93. By extending piston rod 100, pusher plate 90 will be pivoted upwardly to the non-obstructing position.

After containers 7 have been assembled on turntable 23, cylinder 97 is actuated to move pusher plate 90 across the turntable and push a pair of containers 7 onto discharge conveyor 11.

As the pusher 90 completes its stroke of pushing movement turntable 23 is rotated to bring the second pair of assembled containers 7 into the path of movement of the pusher 90. On the return stroke of the pusher 90, the pusher plate is pivoted upwardly to the non-obstructing position, so that it will not interfere with the remaining containers 7, as the turntable is being rotated to position the remaining containers in alignment with the stroke of movement of the pusher plate 90.

The invention also includes a provision for rejecting assembled containers 7, either because of a defect in the containers or, alternately, in the event that downstream equipment is not capable of keeping up with the supply of assembled containers being discharged on conveyor 11. The reject mechanism includes an inclined chute 103, which extends downwardly and outwardly from turntable 23, and the chute is provided with a pair of channel side guides 104 which guide the assembled containers as they move down chute 103. To reject containers 7, pusher plate 90 is pivoted upwardly to its non-obstructing position and pusher plate is then moved across turntable 23 in its outward stroke of movement. As the pusher plate at this time is pivoted upwardly, it will not push the containers onto discharge conveyor 11. After the pusher plate 90 has reached the end of its outward stroke, plate 90 is pivoted downwardly to the vertical position. On the return stroke, the plate 90 will then draw a pair of the containers 7 rearwardly into the reject chute 103. After discharging a pair of containers to the reject chute, the turntable 23 is rotated to position the second pair of containers 7 in alignment with the stroke of movement of pusher plate 90 and the procedure can be repeated to feed the second pair of containers to reject chute 103, or alternately, the second pair of containers can be fed to discharge conveyor 11.

OPERATION

At the start of the cycle, the transfer unit 9 is located above assembly station 4. The parts 5 and 6 are then deposited either by a robot or manually in the pockets 15 of plates 13 at the respective receiving stations 2 and 3. In each case, the open sides or faces of parts 5 and 6 faced downwardly.

A suitable sensing mechanism generates a signal that the parts 6 are in the pockets 15 at receiving station 3. Cylinder 68 is then operated to move the transfer unit 9 to a location above receiving station 3. Cylinder 73 is then actuated causing plate 72 to be lowered to bring the suction cups 80 into contact with the upper surfaces of parts 6. A vacuum is created through line 81 to firmly hold the suction cups 80 against the parts 6.

Plate 2 carrying the parts 6 is then elevated to a location above the plate 13 at the receiving station 3 and the plate 72 will wait in this position.

Inverting unit 8 is then operated, causing beams 21 and turntable 23 to pivot from an upright position at the assembly station 4 to an inverted position over receiving station 2. Cylinders 45 are then operated causing the locator pins 43 and suction cups 48 to be extender from the surface of the turntable 23. The locator pins 43 will engage the holes 47 in parts 5 at the receiving station to properly locate the parts 5, while the suction cups 48 will engage the upper surface of parts 5. By drawing a vacuum through lines 48b the suction cups will tightly engage the parts 5.

Drive mechanism 36 is then operated to pivot the beams 21 and turntable 23 back to the original position at the assembly station 4. Due to this pivoting action, the open sides of parts 5 will now be facing upwardly.

A sensing mechanism will generate a signal showing that the turntable 23 has returned to its original position and carriage 64 of transfer unit 9 is then operated to move the plate 72, which is carrying the parts 6, to he assembly station 4. With the plate 72 at the assembly station 4, cylinder 73 is operated to lower plate 72 and bring the parts 6 into contact with the parts 5 mounted on turntable 23, to thereby assemble the parts to form the assembled containers 7. Engagement of the pilot pins 85 with the bushings 86 in turntable 23 will ensure that the parts 5 and 6 are properly oriented and aligned for assembly.

As shown in FIG. 1, the upper surface of plate 13 at receiving station 2 is located in the same horizontal plane as the axis of shaft 29, while the upper surface of the turntable 23 is lower than that plane by the thickness of the part 5. This ensures that the mating edges of parts 5 and 6 will be in contact when they are assembled to form the container 7.

With the containers 7 assembled, the vacuum is released to suction cups 48 and 80 associated with the pair of containers aligned with pusher plate 90, and the locator pins 43 and suction cups 48 of that pair, are moved downwardly through operation of cylinder 45. Plate 72 is then moved upwardly through operation of cylinder 73 to disengage pilots 85 from bushings 86. The suction cups 48 and 80 associated with the second pair of containers, not aligned with pusher plate 90, as well as the locator pins 43 of that pair, are maintained in engagement with the containers to prevent misalignment of the containers under centrifugal force when the platform is subsequently rotated.

Pusher plate 90 is then pivoted downwardly to the vertical position and through operation of cylinder 97, the pusher plate moves outwardly across turntable 23 to push a pair of the assembled containers 7 from the turntable onto discharge conveyor 11. At the end of the stroke, the pusher plate 90 is pivoted upwardly to the unobstructing position through operation of cylinder 101 and returns to its original position through operation of cylinder 97. Simultaneously, turntable 23 is rotated through operation of drive mechanism 25 to rotate the second pair of assembled containers into position in alignment with the stroke of pusher plate 90. After suction cups 48 and 80 and pins 43 associated with the second pair of containers are released. The procedure is then repeated to push the second pair of containers 7 onto the discharge conveyor 11.

While the drawings show four parts or container halves 5 and 6 being fed to each receiving station 2 and 3, it is contemplated that one or more parts could be fed to the receiving stations.

Various modes of carrying out this invention are contemplated as being within the scope of the following claims particularly pointing out and distinctly claiming the subject matter which is regarded as the invention.

What is claimed is:

1. In an apparatus for assembling articles from a pair of components, assembly means for assembling a plurality of articles and including support means to support the assembled articles, reciprocating pusher means mounted for movement relative to said support means for discharging assembled articles from said support means to a discharge site, said pusher means comprising a pusher member mounted for reciprocating movement in a pushing stroke in which said pusher member will push an article from said support means and a return stroke, said pusher member also being pivotable between an operative position where said pusher member will engage an article on said support means when said pusher member is moved in said pushing stroke and a retracted position where said pusher member will not engage said article when said pusher member is moved in said pushing stroke, discharge means located adjacent said support means for receiving an article as it is pushed from said support means by said pusher member when said pusher member is in the operative position and is moved in the pushing stroke, and reject means located opposite said discharge means and disposed to receive an article when said pusher member is in the operative position and is moved in the return stroke to thereby conduct an assembled article to a reject site.

2. The apparatus of claim 1, in which said pusher member is mounted for pivotal movement between the operative position and the re-tracted position.

3. An apparatus for assembling articles from a pair of tray-like components each having an open side, comprising a supporting structure defining a first receiving station, a second receiving station and an assembly station, first support means at said first receiving station to support a first component with the open side facing down, second support means at said second receiving station to support a second component with the open side facing down, inverting means for transferring said first component from said first receiving station to said assembly station and inverting said first component so that the open side faces up, said inverting means including a platform to support said first component as it is transferred from said first receiving station to said assembly station, a carriage mounted for movement from a first position disposed at said assembly station to a second position above said second receiving station, second drive means for moving said carriage between the first and second positions, a transfer member mounted for vertical movement relative to said carriage, third drive means for moving said transfer member relative to said carriage, gripping means associated with said transfer member for engaging and gripping said second component when said transfer member is lowered from said carriage and said carriage is at the second position, elevation of said transfer member serving to lift said second component from said second support means and movement of said carriage from said second position to said first position transferring said second component to said assembly station, and means for moving said carriage and said platform relative to each other at said assembly station to bring said first and second components into mating engagement to form an assembled article, and discharge means for discharging said assembled article from said platform to a discharge site.

4. The apparatus of claim 3, wherein said means for moving the carriage and platform relative to each other comprises fluid cylinder means.

5. The apparatus of claim 3, and including locating means for locating said second components in mating engagement with said first component as said first and second components are moved into assembled relation.

6. An apparatus for assembling articles from pairs of components, each component having an open face, comprising a frame having an assembly station and having a first and second receiving station each disposed on opposite sides of said assembly station, support means at said first receiving station to support a plurality of first components, support means at said second receiving station to support a plurality of second components, a platform disposed at said assembly station, means for mounting the platform for pivotal movement from a first position at said assembly station to a second position above said first receiving station, said platform having a supporting surface facing upwardly when said platform is at said assembly station and said supporting surface facing downwardly when said platform is above said first receiving station, first drive means for moving said platform between said first and second positions, gripping means associated with said supporting surface for gripping said first components when said platform is at said second position, pivotal movement of said platform from said second position to said first position acting to transfer said first components to said assembly station and invert said first components, a carriage mounted for movement from a first carriage position located above said assembly station to a second carriage position above said second receiving station, second drive means for moving said carriage between said first and second carriage positions, a transfer member mounted for vertical movement relative to said carriage, third drive means for moving said transfer member relative to said carriage, second gripping means associated with said transfer member for gripping said second components when said transfer member is lowered from said carriage when said carriage is at said second carriage position, elevation of said transfer member serving to lift said second components from said second support means and movement of said carriage from said second carriage position to said first carriage position transferring said second components to said assembly station, actuation of said third drive means when said carriage is at said assembly station moving said second components downwardly into mating assembled relation with said first components to form a plurality of assembled articles, pusher means disposed adjacent said platform and mounted for movement between a retracted position and an extended position, said pusher means being constructed and arranged so that movement of said pusher means in a path of movement from said retracted to said extended positions will push said assembled articles from said platform to a discharge site.

7. The apparatus of claim 6, and including means for mounting said platform for rotation about a vertical axis, said assembled articles being disposed in a plurality of rows on said platform, the path of movement of said pusher means in moving between said retracted and extended positions being disposed in alignment with one of said rows, whereby movement of said pusher means from the retracted to the extended position will push said row of articles from said platform, and means for rotating said platform about said vertical axis to position a second of said rows of articles in alignment with said path of movement.

8. An apparatus for assembling articles, a first station having a first supporting surface, a second station having a second supporting surface, pivotal means for mounting said second support surface for movement from a first upright position at said second station where said second supporting surfaces faces upwardly to a second inverted position at said first station where said second supporting surface faces downwardly and is parallel to said first supporting surface, and drive means for pivoting said second supporting surface between said positions, said drive means including a rotatable driving member having a plurality of peripheral teeth, a rotatable driven member operably connected to said second supporting surface and having a plurality of peripheral teeth, a timing belt interconnecting the teeth on said members and extending between said members in a first run and a second run, movable means disposed in engagement with said first and second runs for increasing the length of said first run and simultaneously decreasing the length of said second run to vary the orientation of the teeth of said members and correspondingly change the relative location of said second supporting surface with respect to said first supporting surface when said second supporting surface is in the inverted position, and gripping means carried by said second supporting surface for gripping an article supported on said first supporting surface when said second supporting surface is in the inverted position.

9. An apparatus for assembling articles, a first receiving station having a supporting surface to receive a plurality of articles, locating means on said first supporting surface to position said article in a pair of parallel rows, a second station disposed adjacent said first station and including a second supporting surface, pivotal means for mounting said second support surface for movement from a first upright position at said second station where said second supporting surfaces faces upwardly to a second inverted position at said first station where said second supporting surface faces downwardly and is parallel to said first supporting surface, drive means for pivoting said second supporting surface between said positions, gripping means carried by said second supporting surface for engaging and gripping said articles disposed on said first supporting surface when said second supporting surface is in the inverted position, mounting means for mounting said second supporting surface for rotation about a vertical axis, pusher means mounted for travel in a path of movement from a retracted position to an extended position, said path of movement being aligned with one of the rows of articles on said second supporting surface when said second supporting surface is in the upright position, second drive means for moving said push means between said retracted and extended positions to thereby push said one row of articles from said second supporting surface, and means for rotating said second supporting surface about said vertical axis to position a second of said rows of articles in alignment with said path of movement.

10. The apparatus of claim 9, and including release means for releasing said gripping means when said second supporting surface is in said first upright position.

11. The apparatus of claim 10, wherein said griping means comprises a plurality of suction cups constructed and arranged to engage said articles.

12. The apparatus of claim 11, and including vacuum means connected to said suction cups for creating a vacuum in said cups, said release means comprising means for releasing said vacuum means.

13. An apparatus for assembling articles from a pair of tray-like components each having an open side, comprising a supporting structure defining a first receiving station, a second receiving station and an assembly station, first support means disposed at said first receiving station for support a plurality of first components in a plurality of rows, second support means at said second receiving station to support a plurality of second components in a plurality of rows, a platform located at said assembly station, and having a supporting surface, said supporting surface facing upwardly when said platform is at said assembly station, means for mounting said platform for pivotal movement from a first position at said assembly station to a second position above said first support means at said first receiving station, said supporting surface facing downwardly at said first receiving station, drive means for moving said platform between said first and second positions, gripping means associated with said supporting surface for gripping said plurality of first components when said platform is at said second position, movement of said platform from said second position to said first position acting to invert said second components on said supporting surface, transfer means for transferring said second components from said second receiving station to said assembly station, means for moving said first and second components into mating assembled relation at said assembling station to form a plurality of assembled articles, and discharge means for discharging said assembled article from said assembly station to a discharge site, said discharge means comprising a pusher member mounted for movement in a path of travel from a retracted position to an extended position, said path of movement being aligned with one of said rows of assembled articles, second drive means for moving said pusher member between said retracted and extended positions to thereby push said one row of articles from said platform, means for mounting said platform for rotation about a vertical axis, and means for rotating said platform about said vertical axis to position a second of said rows of assembled articles in alignment with said path of movement.

14. The apparatus of claim 13, wherein said pusher member is also mounted for movement between a generally vertical pushing position where it will engage said row of assembled articles as it is moved in a first direction between the retracted and extended position and an unobstructing position where said pusher member will not contact said assembled articles as it is moved in a second direction between said retracted and extended position.

15. The apparatus of claim 14, wherein said pusher member is mounted for movement between said pushing position and said non-obstructing position.

16. The apparatus of claim 13, wherein said transfer means comprises a carriage mounted for movement from a first position above said assembly station to a second position above said receiving station, drive means for moving said carriage between said first and second positions, and second griping means associated with said carriage for engaging and gripping said second components when said carriage is in said second position.

17. The apparatus of claim 16, wherein said second gripping means comprises a plurality of suction cusp.

18. The apparatus of claim 16, and including locating means for locating said second components in mating engagement with said first components as said first and second components are moved into assembled relation.

* * * * *

UNITED STATES PATENT AND TRADEMARK OFFICE
CERTIFICATE OF CORRECTION

PATENT NO. : 5,038,462

DATED : August 13, 1991

INVENTOR(S) : WOLFGANG C. DORNER ET AL

It is certified that error appears in the above-identified patent and that said Letters Patent is hereby corrected as shown below:

Co.. 9, Line 40, CLAIM 2, Delete "re-tracted" and substitute therefor --retracted--; Col. 11, Line 11, CLAIM 8, Delete "an" and substitute therefor --In an--; Col. 11, Line 14, CLAIM 8, Cancel "support" and substitute therefor --supporting--; Col. 11, Line 16, CLAIM 8, Delete "surfaces" and substitute therefor --surface--; Col.11, Line 39, CLAIM 9, Delete "an" and substitute therefor --In an--; Col. 11, line 43, CLAIM 9, Delete "article" and substitute therefor --articles--; Col. 11, Line 46, CLAIM 9, Delete "support" and substitute therefor --supporting--; Col. 11, Line 48, CLAIM 9, Delete "surfaces" and substitute therefor --surface--; Col. 11, Line 64, CLAIM 9, Delete "push" and substitute therefor --pusher--; Col. 12, Line 6, CLAIM 11, Cancel "griping" and substitute therefor --gripping--;

UNITED STATES PATENT AND TRADEMARK OFFICE
CERTIFICATE OF CORRECTION

PATENT NO. : 5,038,462

DATED : August 13, 1991

INVENTOR(S) : WOLFGANG C. DORNER

It is certified that error appears in the above-identified patent and that said Letters Patent is hereby corrected as shown below:

Col. 12, Line 22, CLAIM 13, After "station" delete "," (comma);
Col. 12, Line 41, CLAIM 13, Delete "article" and substitute therefor --articles--; Col. 12, Line 44, CLAIM 13, Delete "movement in a path of travel" and substitute therefor --travel in a path of movement--; Col. 12, Line 65, CLAIM 15, Before "movement" insert --pivotal--; Col. 13, Line 4, CLAIM 16, Delete "griping" and substitute therefor --gripping--; Col. 14, Line 2, CLAIM 17, Delete "cusp" and substitute therefor --cups--

Signed and Sealed this

Fourth Day of May, 1993

Attest:

MICHAEL K. KIRK

Attesting Officer

Acting Commissioner of Patents and Trademarks